United States Patent
Graur et al.

(10) Patent No.: US 9,690,898 B2
(45) Date of Patent: Jun. 27, 2017

(54) GENERATIVE LEARNING FOR REALISTIC AND GROUND RULE CLEAN HOT SPOT SYNTHESIS

(71) Applicant: GLOBALFOUNDRIES INC., Grand Cayman (KY)

(72) Inventors: Ioana C. Graur, Poughkeepsie, NY (US); Ian P. Stobert, Hopewell Junction, NY (US); Dmitry A. Vengertsev, Beacon, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 147 days.

(21) Appl. No.: 14/749,909

(22) Filed: Jun. 25, 2015

(65) Prior Publication Data

US 2016/0378902 A1 Dec. 29, 2016

(51) Int. Cl.
*G06F 17/50* (2006.01)
*G03F 1/36* (2012.01)

(52) U.S. Cl.
CPC ............ *G06F 17/5081* (2013.01); *G03F 1/36* (2013.01); *G06F 17/5077* (2013.01); *G06F 17/5068* (2013.01)

(58) Field of Classification Search
CPC ......................... G06F 17/5068; G06F 17/5081
USPC ...................... 716/54–55, 119, 122
See application file for complete search history.

(56) References Cited

U.S. PATENT DOCUMENTS

| | | | |
|---|---|---|---|
| 6,077,310 A * | 6/2000 | Yamamoto | G03F 1/36 430/30 |
| 7,076,759 B2 | 7/2006 | Jurgens et al. | |
| 8,037,428 B2 | 10/2011 | Tong et al. | |
| 8,234,603 B2 | 7/2012 | Bagheri et al. | |
| 8,402,397 B2 * | 3/2013 | Robles | G06F 17/5081 430/30 |
| 8,443,322 B2 | 5/2013 | Strenski et al. | |
| 8,453,103 B2 | 5/2013 | Bendicksen et al. | |
| 8,863,044 B1 * | 10/2014 | Casati | G06F 17/5081 716/106 |
| 2013/0185687 A1 | 7/2013 | Chung et al. | |
| 2014/0010436 A1 | 1/2014 | Gabrani et al. | |
| 2015/0227670 A1 * | 8/2015 | Gordon | G06F 17/5081 716/52 |

OTHER PUBLICATIONS

Wuu et al., "Efficient approach to early detection of lithographic hotspots using machine learning systems and pattern matching," 2011, 8 pages, Proceedings of SPIE, vol. 7074.
Ding et al., "EPIC: Efficient Prediction of IC Manufacturing Hotspots With a Unified Meta-Classification Formulation," 2012, pp. 263-270, IEEE (3C-1).
Badr et al., "Layout Pattern-Driven Design Rule Evaluation," 2014, 10 pages, Proceedings of SPEI, vol. 9053.
Wuu et al., "Rapid Layout Pattern Classification," 2011, pp. 781-786, IEEE (9A-2).

* cited by examiner

*Primary Examiner* — Stacy Whitmore
(74) *Attorney, Agent, or Firm* — Yuanmin Cai; Hoffman Warnick, LLC

(57) ABSTRACT

Candidate layout patterns can be generated using a generative model trained based on known data, such as historical hot spot data, features extraction, and geometrical primitives. The generative model can be sampled to obtain candidate layouts that can be ranked and repaired using error optimization, design rule checking, optical proximity checking, and other methods to ensure that resulting candidates are manufacturable.

19 Claims, 5 Drawing Sheets

GENERATIVE LEARNING FOR REALISTIC AND GROUND RULE CLEAN HOT SPOT SYNTHESIS

BACKGROUND

The invention relates generally to semiconductor devices and systems for designing and fabricating such devices, particularly to improving device layout in existing and anticipating new technology nodes, more particularly, to broadening an envelope of acceptable design elements to include layouts eliminated under existing methodologies that might actually be useful and manufacturable.

An integrated circuit ("IC") is a device (e.g., a semiconductor device) or electronic system that includes many electronic components, such as transistors, resistors, diodes, etc. These components are often interconnected to form multiple circuit components, such as gates, cells, memory units, arithmetic units, controllers, decoders, etc. An IC includes multiple layers of wiring that interconnect its electronic and circuit components.

Design engineers typically design ICs by transforming logical or circuit descriptions of the ICs' components into geometric descriptions, called design layouts. IC design layouts typically include: (1) circuit modules (i.e., geometric representations of electronic or circuit IC components) with pins, and (2) interconnect lines (i.e., geometric representations of wiring) that connect the pins of the circuit modules. A net is typically defined as a collection of pins that need to be connected. In this fashion, design layouts often describe the behavioral, architectural, functional, and structural attributes of the IC.

To create the design layouts, design engineers typically use electronic design automation ("EDA") applications. These applications provide sets of computer-based tools for creating, editing, analyzing, and verifying design layouts. Fabrication foundries ("fabs") manufacture ICs based on the design layouts using a photolithographic process. Photolithography is an optical printing and fabrication process by which patterns on a photolithographic mask (i.e., photomask) are imaged and defined onto a photosensitive layer coating a substrate. To fabricate an IC, photomasks are created using the IC design layout as a template. The photomasks contain the various geometries (i.e., features) of the IC design layout. The various geometries contained on the photomasks correspond to the various base physical IC elements that comprise functional circuit components such as transistors, interconnect wiring, via pads, as well as other elements that are not functional circuit elements, but that are used to facilitate, enhance, or track various manufacturing processes. Through sequential use of the various photomasks corresponding to a given IC in an IC fabrication process, a large number of material layers of various shapes and thicknesses with various conductive and insulating properties may be built up to form the overall IC and the circuits within the IC design layout.

Constraining factors in traditional photolithographic processes limit their effectiveness as circuit complexity continues to increase and transistor designs become more advanced and ever smaller in size (i.e., die shrink). Some such constraining factors are the lights/optics used within the photolithographic processing systems. Specifically, the lights/optics are band limited due to physical limitations (e.g., wavelength and aperture) of the photolithographic process. Therefore, the photolithographic process cannot print beyond a certain pitch, distance, and other such physical manufacturing constraints.

A pitch specifies a sum of the width of a feature and the space on one side of the feature separating that feature from a neighboring feature. Depending on the photolithographic process at issue, factors such as optics and wavelengths of light or radiation restrict how small the pitch may be made before features can no longer be reliably printed to a wafer or mask. As such, the smallest size of any features that can be created on a wafer is severely limited by the pitch.

With the advance of ultra deep submicron technology, the feature size and feature pitch get so small that existing lithography processes meet their bottleneck in printing the shapes represented by the features. On the other hand, there are difficulties in the practical use of advanced photolithographic processes (e.g., extreme ultra violet (EUV)). Therefore, the current lithography technology is expected to be used for next generation silicon technology. To compensate for the difficulty in printing the shape of small pitches, multiple patterning lithography is recognized as a promising solution for 32 nm, 22 nm, 16 nm, and finer pitches as technology may allow in volume IC production. Multiple patterning lithography technology generally decomposes a single layer of a layout into multiple masks and applies multiple exposures to print the shapes in the layer. However, even multiple pattern lithography has limitations.

Due to inherent difficulties in sub-resolution lithography and modeling of resist processes, the risk of patterns which fail (either by short circuits, opens, or parametric failure) is substantially increased compared to the historical record. The standard industry practice of design rules checking (DRC) has become very difficult to implement due to the number and complexity of required rules and strong possibility that they are either too restrictive for efficient design or fail to detect patterns which will fail. For example, a layout or pattern including one or more "hotspots" based on pitch and other factors may be eliminated despite the pattern actually being useful and manufacturable. In many cases these patterns will be novel (different from what is known), and thus not known to be handled by the existing process stack and/or resolution enhancement techniques, such as optical proximity correction (OPC).

One proposed conservative approach to the layout rules problem is to restrict the allowable local patterns to a set which were previously demonstrated to be manufacturable, at least in a given shape context, on a test site or by rigorous simulation. A pattern is defined as a local region or window of layout, with the window size typically matched to an underlying routing or device grid and width up to a typical "optical radius," within which the strongest influence of proximity effects on a layout are contained. Subsequent design layouts U must be scanned and compared with the known pattern library X, which, for a large number of layout patterns, yields a matching or distance operation with a complexity X*U, in a naïve implementation. Hierarchical cluster or tree matching can reduce this, but, especially for automatically routed layout systems with window sizes approaching the optical radius, the number of existing patterns on the new layout U can be quite large. For example, projections of a number of unique patterns based on layout scans of ungridded 22 nanometer data for optical radius sized windows can be as high as 500 million. As a result of these large numbers of patterns and associated computations, processor load for conventional distance-based matching techniques is very high, and might require runtime of distance-based novelty detection on the order of a CPU year.

Another approach is to change the manner in which layouts are created by EDA in the first place.

SUMMARY

Embodiments of the invention disclosed herein can take the form of a semiconductor device design layout generation computer program product stored on non-transitory computer readable storage media in the form of computer executable code including instructions that when executed by a computing device cause the computing device to perform a method that can apply a generative model to generate a plurality of candidate layout images based on at least a feature library. The feature library can include features extracted from known layouts, the features being represented by respective feature images in a first colorspace. The plurality of candidate layout images can be in a second colorspace and can be ranked based on a first difference value representing a degree of difference between each candidate layout image and the feature images in the feature library. Any candidate layout image having a first difference value below a predefined minimum first difference threshold can be removed to form a culled group of candidate layout images. A repair procedure can be performed on the culled group to produce a plurality of compliant candidate layout images in the first colorspace. In some implementations, the plurality of compliant candidate layout images can be ranked based at least in part on a respective second difference value representing a degree of difference between each clean candidate layout image and the feature images of the feature library.

Additional embodiments of the invention disclosed herein can take the form of a semiconductor device design layout generation computer program product stored on non-transitory computer readable storage media in the form of computer executable code including instructions that when executed by a computing device cause the computing device to perform a method in which a generative model can be applied to generate a plurality of candidate layouts based on at least a feature library of features extracted from known layouts and represented in a first colorspace. Each candidate layout can include a probabilistic layout image in a second colorspace having at least one channel in which each pixel includes a respective channel value that represents a probability of appearance of the pixel. The plurality of candidate layout images can be ranked based on a first difference value representing a degree of difference between each candidate layout image and the features in the feature library, and any candidate layout image having a first difference value below a predefined minimum first difference threshold can be removed to form a culled group of candidate layout images, upon which a repair procedure can be performed to produce a plurality of compliant candidate layout images in the first colorspace. The repair procedure can include thresholding the respective channel value of each pixel of each image of the culled group using a predefined threshold channel value representative of a desired minimum probability of success, thereby converting each pixel having a channel value above the threshold channel value to a first color value of the first colorspace and converting each pixel having a channel value below the threshold channel value to a second color value of the first colorspace.

Further embodiments of the invention disclosed herein can take the form of a semiconductor layout generation system including a computer program product stored on non-transitory computer readable storage media in the form of computer executable code including instructions that when executed by a computing device cause the computing device to perform method in which a generative model can be trained using a feature library having training data based on known layouts. A plurality of candidate layouts can be generated using the generative model and the feature library by sampling from the generative model, and candidate layouts having an associated probability value above a predefined minimum probability threshold can be selected to obtain a sample layout group on which a repair procedure can be performed based on the sample layout group to obtain at least one compliant candidate layout.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings.

Figure 1:
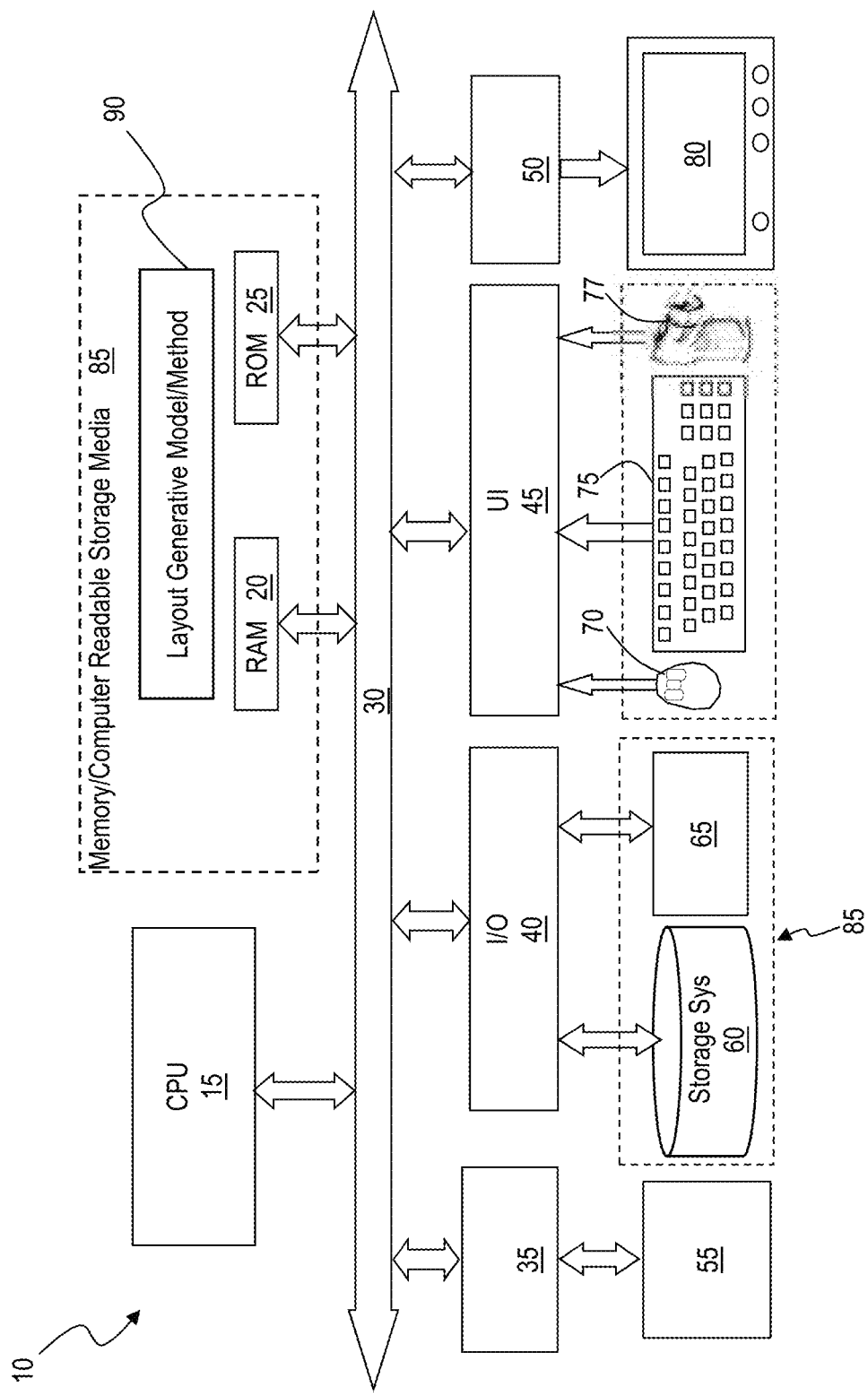
FIG. 1 is a schematic diagram of a computing environment with which embodiments of the invention disclosed herein can be implemented and in which embodiments of the invention disclosed herein can be executed.

It is noted that the drawings of the invention are not necessarily to scale. The drawings are intended to depict only typical aspects of the invention, and therefore should not be considered as limiting the scope of the invention. It is understood that elements similarly numbered between the FIGURES may be substantially similar as described with reference to one another. Further, in embodiments shown and described with reference to FIGS. 1-5, like numbering may represent like elements. Redundant explanation of these elements has been omitted for clarity. Finally, it is understood that the components of FIGS. 1-5 and their accompanying descriptions may be applied to any embodiment described herein.

DETAILED DESCRIPTION

Broadly, embodiments can use a feature library to train a generative model that can be sampled to obtain a plurality of candidate patterns or layouts. The candidate patterns or layouts can be ranked and/or repaired to produce patterns or layouts that are close to design-rule compliant and lithographically complex. The resulting patterns or layouts can be stored for use in IC design and/or can be fed back into the feature library to refine the generative model.

The feature library can include geometrical primitives, patterns, clips, and/or one or more complex designs and/or features of these primitives, such as raster, diffraction orders, and/or other features as may be desired and/or appropriate. In addition, the feature library can include a probability density function (PDF) for each data point or feature. The generative model can be probabilistic in that it can model a PDF that is a function $p(X;\theta)$ of input layout data X (from the feature library) that includes a set $X_1, \ldots, X_N \in \mathbb{R}^d$ and model parameters $\theta$ based at least in part on a likelihood L of data X. During training using the training data X, model parameters $\theta$ can be determined by maximizing the likelihood L of data X, which can yield a PDF from a family of PDFs of the feature library that is most likely to have generated the given input data points. This PDF can then be incorporated into the generative model.

A number of types of models can be employed to optimize likelihood in embodiments. For example, a Gaussian mixture model (GMM) can be employed, as well as deep generative models, such as a restricted Boltzmann machine (RBM) model, a deep Boltzmann machine (DBM) model, deep belief net (DBN), an auto-encoder, or any other model and/or combination thereof as may be suitable and/or desired.

Once the generative model is trained, a generation or sampling procedure can be run to sample data from the model's probability density function. Sampled data can be arrays represented as images in a first colorspace, such as grayscale probabilistic layouts. These layouts can then be ranked based on, for example, their originality as compared to the training data in the feature library. For example, originality can be expressed using a metric, such as a mathematical or geometric distance, and applying a comparison, such as simple $l_2$ norm comparison. Examples of metrics that can be used include Euclidean distance, Hamming distance, Mahalanobis distance, and Manhattan distance, though other metrics can be used as desired, suitable, and/or appropriate. Because probability density functions can be obtained from realistic training data, the probability of random and/or noisy constructs to be sampled from PDF can be very low.

A typical design evaluation technique includes conducting a prescriptive search, which typically begins with building a library X of known, manufacturable patterns $X_1$, $X_2, \ldots, X_N$. The patterns in library X are typically in compliance with design rules checking (DRC) and other standards, and so can be called compliant patterns. The library X can be built, for example, using a feature extraction technique on one or more layouts known to be compliant and/or manufacturable to scan the compliant layout(s) and extract compliant pattern(s) $X_i$, $i \in \overline{1,N}$, therefrom, though other techniques can be employed to build library X as may be suitable and/or desired. Examples of feature extraction techniques or routines that might be used include those disclosed in U.S. Pat. Nos. 7,415,695 and 8,201,132, the disclosures of which are incorporated by reference, though any other feature extraction technique can be employed as may be desired and/or suitable. For example, feature extraction can employ a "clip scan window" of a particular size, dependent in part on an optical radius of the instrument scanning the candidate layout and/or an allowed wire termination size. The clip scan window starts at a known location in the compliant layout, captures an image of the portion of the compliant layout visible in the window, then progresses to a next location, captures an image of the portion of the compliant layout there, and continues until the entire compliant layout has been scanned. Depending on the particular technique, each captured image can be treated as a compliant pattern X, or analysis can be performed on the captured images to identify compliant patterns X.

With library X built, feature extraction is typically employed to identify at least one candidate pattern $u_i$ of a candidate design U, which candidate pattern(s) $u_i$ are then assessed to determine how similar they are to each compliant pattern $X_i$ in library X. To assess each candidate pattern $u_i$, a "nearest neighbor search" (NNS) can be conducted, in which a measure of the similarity between candidate pattern $u_i$ and each compliant pattern $X_i$ of the library X can be determined. A simplest form of a NNS is a linear or so-called "naïve" search, in which, for example, the Euclidean distance $D(X_i, u_i) = \|X_i - u_i\|_{l_2} = \sqrt{\Sigma_i (X_i - u_i)^2}$ between the candidate pattern $u_i$ and each pattern $l_i$ in L can be used. Euclidean distance is, of course, based on the Euclidean norm or $l_2$-norm derived from the definition of the $l_g$-norm of a vector x as $\|x\|_{l_g} = \sqrt[g]{\Sigma_i |x_i|^g}$, with $g \in \mathbb{R}$. It should be noted that the term "Euclidean norm" is also used in the art to refer to the Frobenius norm, but in the instant description and claims, "Euclidean norm" will only be used to refer to the $l_2$-norm.

If the candidate pattern $u_i$ is represented by a Fourier Transform or a Discrete Cosine Transform, the Euclidean distance can be performed on a one dimensional array (a vector) of coefficients, computing the difference between the signal of the candidate pattern $u_i$ and that of a respective known pattern $X_i$ of library X. Typically, principle component analysis (PCA) dimensionality reduction can be performed to reduce the computational cost per distance calculation. Candidate patterns with a Euclidean distance above a threshold distance value can be termed non-matching and can go through a waiver process. An example of a waiver process can involve a more detailed optical and resist simulation process, which would be costly to perform on the entire layout during optical proximity correction (OPC), and some manual or automated inspection of resulting dimensions and tolerances.

An additional example of distance based computation include the "Fuzzy Swampfinder" system used the Walsh basis to represent sample patterns (see, for example, U.S. Pat. No. 8,201,132, incorporated by reference above, as well as U.S. Pat. No. 7,685,544, the disclosure of which is incorporated by reference). This technique could be used, for example, to find the nearest matches between candidate patterns and known patterns, and included clustering vectors to choose representative patterns for testing. This allowed problems with optical proximity checking (OPC) to be found using optical rules checking (ORC) on a small representative layout prior to a full OPC run, reducing computational demands. A variant of this approach is to search for nearest neighbor patterns via a two level search, matching first on a cluster of representatives, then to members of the nearest cluster. Another previous technique, the U.C. Berkeley Pattern Matcher disclosed in U.S. Patent Application Publication No. 2003/0103189, the disclosure of which is incorporated by reference, finds unique representative patterns using a series of pixel block reductions, such as bit packing, which progressively reduce the set to be searched. The candidate matches can then be searched at higher resolution for more accuracy. Even these improved comparison techniques, however, become impractical when pattern sets X and U become very large, since the matching comparison still requires many operations.

Embodiments of the invention disclosed herein can evaluate candidate layouts sampled from the generative model for novelty using any of the techniques described above or any other technique as may be suitable and/or desired. An example of a technique requiring reduced computational load is described in U.S. Pat. No. 8,863,044 to Casati et al., the disclosure of which is incorporated by reference. The technique of Casati et al. can reduce the computational load required to detect novel layouts and/or patterns by identifying patterns that are new, as opposed to identifying to which known patterns an unknown pattern is most similar. In other words, computational load can be reduced by detecting what is different instead of a degree of similarity. In addition, the technique of Casati et al. can require far fewer samples of a given pattern as a result of employing sparse coding, dictionary learning, compressive sampling/sensing, and/or other signal analyses in the context of semiconductor layouts.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows an example of a block diagram of a general-purpose computer system 10 which can be used to implement the method, system, computer program, and/or computer program product described herein. The method, system, computer program, and/or computer program product may be coded as a set of instructions on removable or hard media for use by general-purpose computer, and thus may, in embodiments, include a computer program product. FIG. 1 is also a schematic block diagram of a general-purpose computer for practicing the present invention. Computer system 10 can have at least one microprocessor or central processing unit (CPU) 15. CPU 15 can be interconnected via a system bus 30 to machine readable media 85, which can include, for example, a random access memory (RAM) 20, a read-only memory (ROM) 25, a removable and/or program storage device 65, and/or a mass data and/or program storage device 60. An input/output (I/O) adapter 40 can connect mass storage device 60 and removable storage device 65 to system bus 30. A user interface 45 can connect a keyboard 75 and/or a mouse 70 and/or an image capture device 77, such as a camera, and/or any other suitable input device to system bus 30, and a port adapter 35 can connect a data port 55 to system bus 30 and a display adapter 50 can connect a display device 80. ROM 25 can include the basic operating system for computer system 10. Examples of removable data and/or program storage device 65 include magnetic media such as floppy drives, tape drives, portable flash drives, zip drives, and optical media such as CD ROM or DVD drives. Examples of mass data and/or program storage device 60 include hard disk drives and non-volatile memory such as flash memory. In addition to keyboard 75 and mouse 70, other user input devices such as trackballs, writing tablets, pressure pads, microphones, light pens and position-sensing screen displays may be connected to user interface 45. Examples of display device 80 include cathode-ray tubes (CRT), liquid crystal diode (LCD) displays, light emitting diode (LED) displays, plasma displays, holographic displays, tactile displays, and/or any other display device as may be available, suitable, and/or known now and/or in the future.

A machine readable computer program may be created by one of skill in the art and stored in computer system 10 or a data and/or any one or more of machine readable medium 85, such as in the form of a computer program product 90, to simplify the practicing of this invention. In operation, information for the computer program created to run the present invention can be loaded on the appropriate removable data and/or program storage device 65, fed through data port 55, acquired with image capture device 77, and/or entered using keyboard 75. A user can control the program by manipulating functions performed by the computer program and providing other data inputs via any of the above mentioned data input means. Display device 80 can provide a means for the user to accurately control the computer program and perform the desired tasks described herein.

Computer program product 90 according to embodiments of the invention disclosed herein can be stored in memory and/or computer readable storage media 85, in embodiments. While shown as outside of RAM 20 and ROM 25, it should be readily apparent that computer program product 90 and/or portions thereof can reside in these and/or any other storage medium accessible by computer system 10. It should be noted that CPU(s) 15 can in embodiments be called a computing device(s), but that computer system 10 as a whole, or portions thereof, could also be called a computing device.

Figure 2:
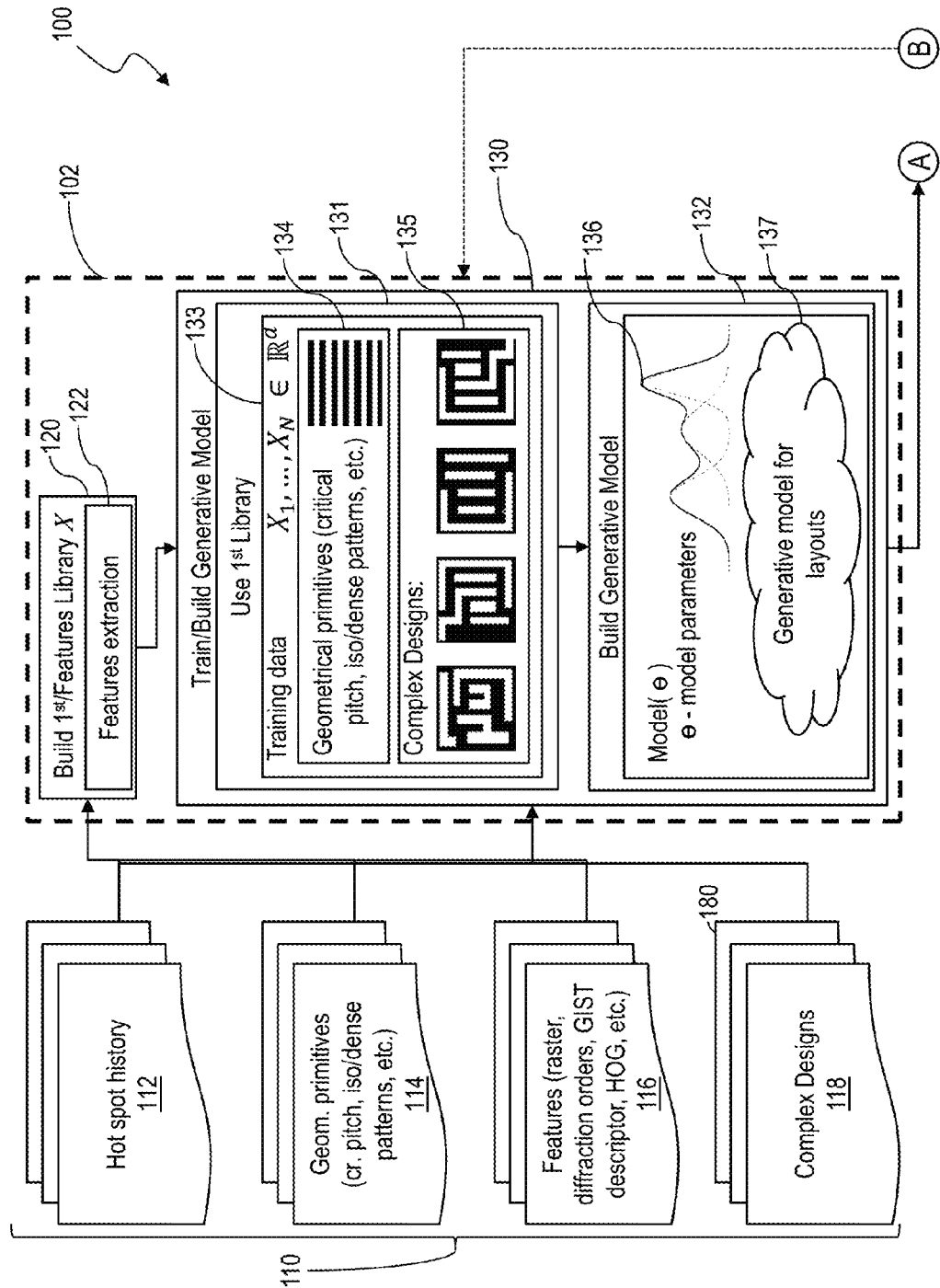
FIGS. 2 and 3 illustrate a schematic flow diagram of a layout generation method according to embodiments of the invention disclosed herein.
Figure 3:
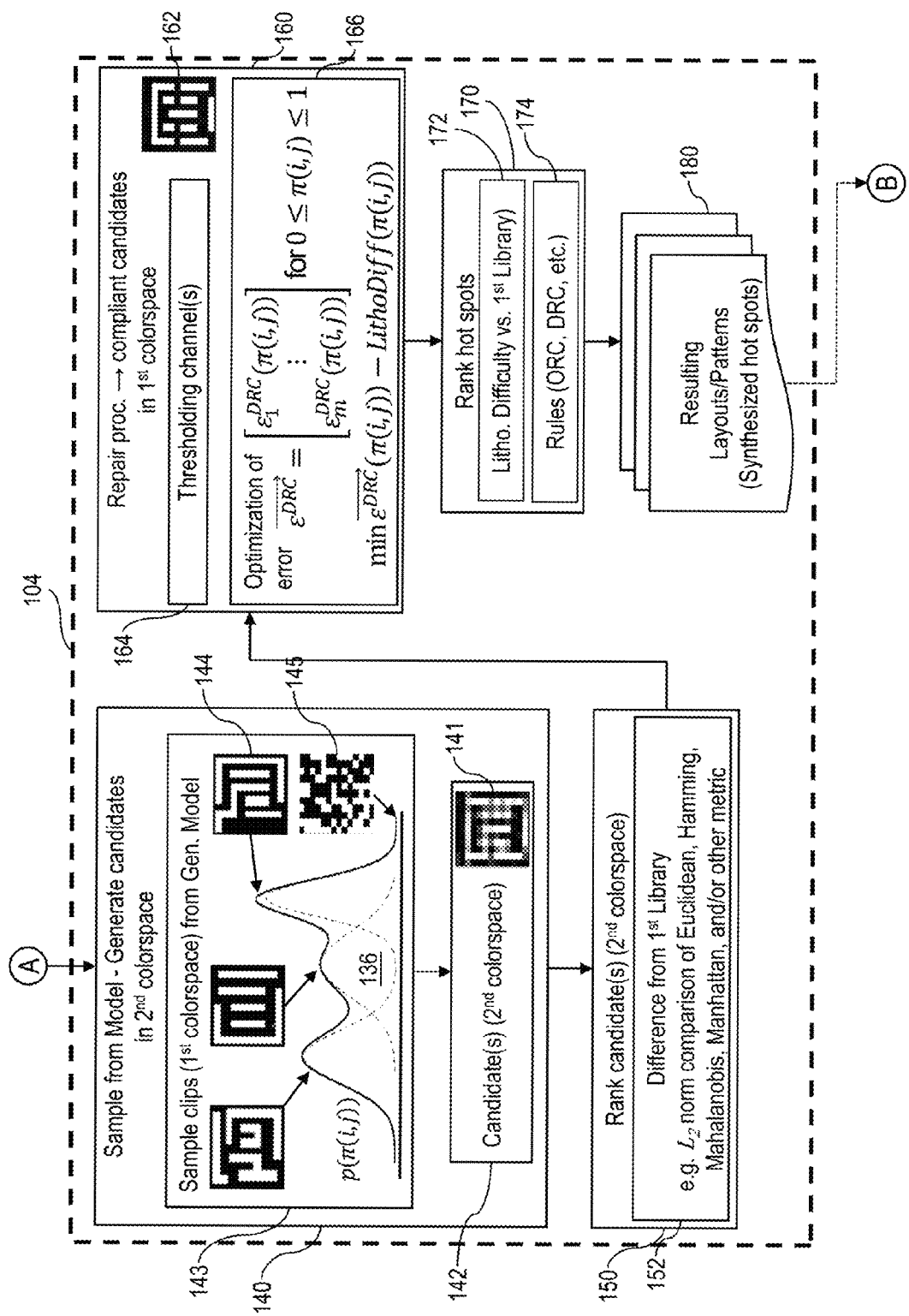
Figure 4:
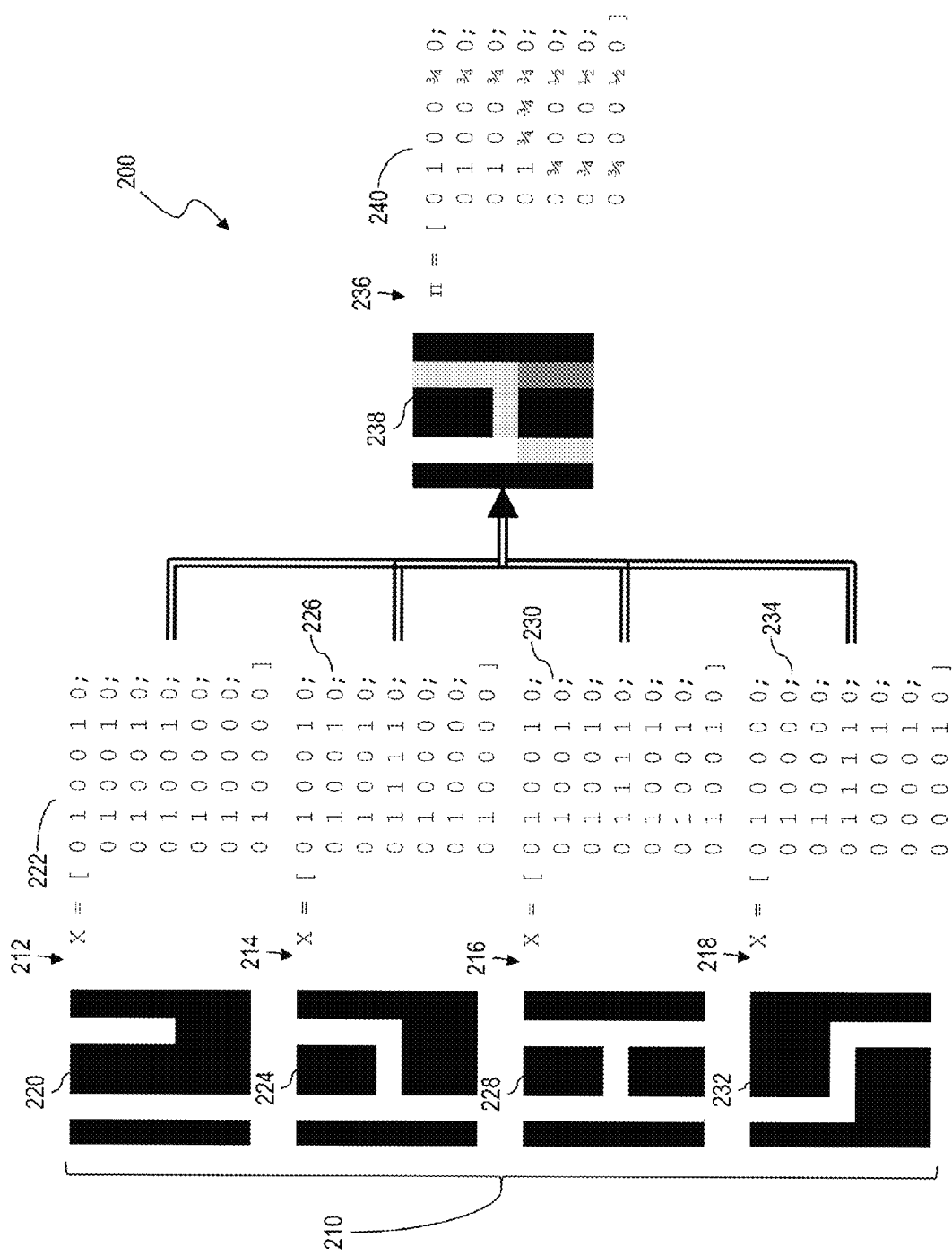
FIG. 4 is a schematic diagram of a candidate layout generation method according to embodiments of the invention disclosed herein.

With reference to FIGS. 2 and 3, a layout generation method and/or system 100 can include a training portion 102 (FIG. 2) and a generation portion 104 (FIG. 3). In training portion 102, sources of input data 110 can be used to build a first library (block 120), which can be a feature library and/or can be represented as an array X Input data 110 can be obtained from and/or provided by a number of sources, which can include, for example, databases, image repositories, layouts from previous technology nodes, which can be scaled accordingly, or the like. For example, input data 110 can include a hot spot history source 112, a geometrical primitives source 114, a features source 116, a complex design source 118, and/or any other source as may be desired and/or appropriate. Features source 116 can include, but is not limited to, raster descriptors, diffraction orders, GIST descriptors, and/or Histograms of Oriented Gradients (HOG). As used herein, "hot spot" means a point or region in a layout or pattern that presents difficulty in fabrication as indicated by an evaluation of the layout or pattern, such as by using design rule checking (DRC), optical proximity checking (OPC), optical rule checking (ORC), or any other suitable evaluation method or technique. Any such data source can be included and/or stored on, for example, a non-transitory computer readable storage medium 85 of the example computing system 10 shown in FIG. 1. Building first library (block 120) can include, for example, applying features extraction (block 122), though any other suitable method and/or technique can be employed.

It is conventional to represent layouts and/or patterns and/or designs as images in a colorspace, such as two bit (black and white) images. While embodiments may be explained in terms of images, it should be recognized that this is but one representation of the array of values that describe each layout or pattern. For example, in an embodiment each layout can be a two dimensional array X(m,n), where m and n are pixel coordinates and each pixel has a color value of B for each channel of the colorspace. Building a first or feature library can thus include amassing a plurality of images of layouts and/or patterns and/or clips and/or designs in a first colorspace, though more than one colorspace could be employed. In addition, the first colorspace need not be limited to a two bit depth.

With continued reference to FIG. 2, training portion 102 can include training and/or building a generative model (block 130), such as by using first library (block 131) to build a generative model (block 132). For example, generative model 137 can be based at least in part on a probability density function (PDF) represented by curve(s) 136 and that can be a function $p(X;\theta)$ of input layout or training data X (block 133) and model parameters $\theta$. As suggested above, input layout data can include a set of layouts and/or patterns and/or clips and/or features $X=X_1, \ldots, X_N \in \mathbb{R}^d$, such as geometrical primitives 134 and/or more complex designs 135 from the feature library, while model parameters $\theta$ can be based at least in part on an optimization technique applied to, such as a maximization of, likelihood L of data X. In addition, as noted above, the generative model can include any of a number of models. Where a Gaussian mixture model (GMM) is employed, for example, the PDF can include the relationship:

$$p(X;\theta)=\Sigma_{k=1}^{K}\alpha_k g(X;\mu_k,\sigma_k) \qquad (1),$$

which can be a linear combination of K Gaussian PDFs $g(X;\mu_k,\sigma_k)$ including the relationship $$g(X; \mu_k, \sigma_k) = \frac{1}{\left(\sqrt{2\pi}\,\sigma_k\right)^d} e^{-\frac{1}{2}\left(\frac{\|x-\mu_k\|}{\sigma_k}\right)^2}, \quad (2)$$

in which $\alpha_k$ is a coefficient that describes the relative contribution of each Gaussian PDFs and $\mu_k$ and $\sigma_k$ are the mean and standard deviation of each Gaussian PDF. Also where GMM is used, model parameters $\theta$ can be defined as:

$$\theta = [\theta_k]_{k=\overline{1,K}} = [(\alpha_k, \mu_k, \sigma_k)]_{k=\overline{1,K}}. \quad (3)$$

During training with use of a GMM, parameters $\theta$ can be determined by applying and optimization technique to a likelihood L of data X, such as by maximizing likelihood L of data X, based at least in part on the relationship:

$$L(\theta) = L([(\alpha_k, \mu_k, \sigma_k)]_{k=\overline{1,K}}) = \Pi_{i=1}^{N} \Sigma_{k=1}^{K} \alpha_k g(X_i; \mu_k, \sigma_k) \quad (4)$$

such that $$\theta^* = [(\alpha_k^*, \mu_k^*, \sigma_k^*)]_{k=\overline{1,K}} = \arg\max_{\alpha_k, \mu_k, \sigma_k} L([(\alpha_k, \mu_k, \sigma_k)]_{k=\overline{1,K}}) \quad (5)$$

As should be apparent to those of skill in the art, the relationships (1), (2), (3), (4), and (5) can be different when other models are used in the generative model, which relationships can be determined by those skilled in the art without undue experimentation. While embodiments of the invention may be described as using one PDF in generative model 137, it should be recognized that more PDFs can be employed if appropriate, such as, for example, where colorspaces with multiple channels are employed, though similar results may be enjoyed by employing additional dimensions in one PDF. In addition, training is typically performed infrequently due to computational loads, but as computational power increases, training can be performed more often to refine generative model 137.

In generation portion 104, method 100 can include sampling from the model (block 140), which can include generating candidates 141 in a second colorspace (block 142). In embodiments this can include using PDF 136 of generative model 137 (block 143), which can effectively sample clips 144 in the first colorspace that are most likely to succeed, such as those at peaks of PDF 136, as opposed to less likely to succeed clips 145 in low probability areas of PDF 136, and combining clips 144 to generate the one or more candidates 141 in the second colorspace. Candidates can include layouts and/or patterns and/or fragments thereof represented as arrays and/or as images in the second colorspace. Here, the first colorspace is that used in feature library X, typically a two bit colorspace as discussed above.

The second colorspace can be the same as the first colorspace in embodiments, though use of a different colorspace can be advantageous. For example, with reference to FIG. 4, a simplified method 200 of generating candidate(s) 236 can include combining two bit sampled clips 210, which can include features 212, 214, 216, 218 meeting predefined criteria, such as having a probability of success above a predefined minimum probability threshold. Features 212, 214, 216, 218 can be represented by images 220, 224, 228, 232 in the first colorspace, though the images represent respective arrays of values 222, 226, 230, 234, here arrays X(m,n), where m=7, n=7, each position having a color value of B=0 or 1. Since the images are selected based on probability of success, simply superimposing sample layouts can provide an indication of probability of success of the superimposed layout. In a simplest implementation of embodiments, candidates 210 can simply be added to obtain candidate 236. That is, for the example of four two bit candidate images, an image 238 in a five bit colorspace can be obtained by adding the candidate images or by adding the respective candidate matrices to obtain a resultant matrix 240. However, these values can instead be normalized to reflect probability values between 0 and 1 as shown, which can then easily be applied to a channel of any colorspace of any depth. For example, the values in matrix 240 can be multiplied by 255 to obtain gray values from 0 to 255 in the widely used eight bit grayscale colorspace. An image obtained by doing this is a grayscale image that takes into account the frequency of each pixel being selected in layouts above a threshold of probability of success, and so is a "probabilistic" image that shows the probability of success of each pixel. This is basically using a Naïve Bayes model to generate candidates in the second colorspace. However, this model does not take into account the effect surrounding pixels may have on a given pixel, which can be achieved using other models, such as those suggested elsewhere herein. PDF 136 as used in embodiments can generate probabilistic candidates it images directly.

Candidates can therefore be combinations of feature images meeting predefined criteria and translated or converted into a different second colorspace. Such combinations can be made by, for example, for each candidate, sampling from the generative model by generating a plurality of initial layouts, determining a respective probability of success of each initial layout, selecting layouts of the plurality of initial layouts having respective probabilities of success above a first predefined threshold probability of success, representing each selected layout as a respective selected layout image in the first colorspace and combining the selected layout images to form a candidate layout image including a probabilistic layout image in the second colorspace. In this example, the second colorspace can include at least one channel in which each pixel can include a respective channel value representing a combined probability of success of pixels from the selected layout images.

Generated candidates $\pi_1, \ldots, \pi_q$, q being an integer representing a number of candidates generated, can be ranked (block 150), such as by a degree of difference from content of the first library and/or from input data 110 using a first difference value (block 152). For example, a mathematical distance between each candidate layout image and the first library contents, such as Euclidean, Hamming, Mahalanobis, Manhattan, or any other suitable mathematical distance or metric and/or any combination thereof as may be appropriate and/or desired, such as by using $L_2$ norm comparison. The degree of difference for pixels of generated candidate layouts can be represented in embodiments by values of $0 \leq \pi(i,j) \leq 1$, i.e. probability of each pixel to be "turned on."

In embodiments, candidates below a predefined rank and/or having a first difference value below a predefined minimum first difference value can be removed from the plurality of candidates, thus forming a culled group of probabilistic candidates. After the set of probabilistic candidates is ranked, a repair procedure (block 160) can be applied to obtain one or more compliant candidates 162 in the first colorspace. For example, one or more channels of the candidates in the second colorspace can be thresholded (block 164) in a simple case. However, better results can be obtained by optimizing error and/or lithographic difficulty (block 166). For example, error can be optimized by minimizing design rule violation error $$\overrightarrow{\varepsilon^{DRC}}(\pi) = \begin{bmatrix} \varepsilon_1^{DRC}(\pi) \\ \vdots \\ \varepsilon_n^{DRC}(\pi) \end{bmatrix},$$

where n is a number of rules applied to a current layout. In addition, a suitable optimization technique can include minimizing the design rule normalized errors and maximizing lithographic difficulty, such as by using a cost function or the like based at least in part on the relationship:

$$\min \overrightarrow{\varepsilon^{DRC}}(\pi) - \text{LithoDiff}(\pi),$$

where LithoDiff can be a measure of a respective photolithographic difficulty associated with each pattern π. Lithographic difficulty can be defined, for example, as number of vertices or edges in the unit area of a pattern or layout. It should be noted that the initial condition of the example optimization problem above is a sampled candidate pattern.

In embodiments, repair procedure application (block 160) can include application of rules to compliant candidates 162. Examples of rules that can be applied include thresholding one or more channels of the second colorspace to cull candidates and/or portions thereof that have a channel value below a desired and/or threshold value, which can result in translating the candidates back into the first colorspace. Other examples of rules that can be applied include, but are not limited to, error optimization, design rule checking (DRC), optical proximity checking (OPC), optical rule checking (ORC), and/or other rules if desired and/or suitable and/or appropriate. Thus, each second colorspace candidate image can be reconstructed into multiple first colorspace candidate images, each of which can be construed as a downconverted candidate layout image, that can then be evaluated for feasibility and/or likelihood and/or difference from the feature library and/or lithographic difficulty and/or any combination thereof.

Figure 5:
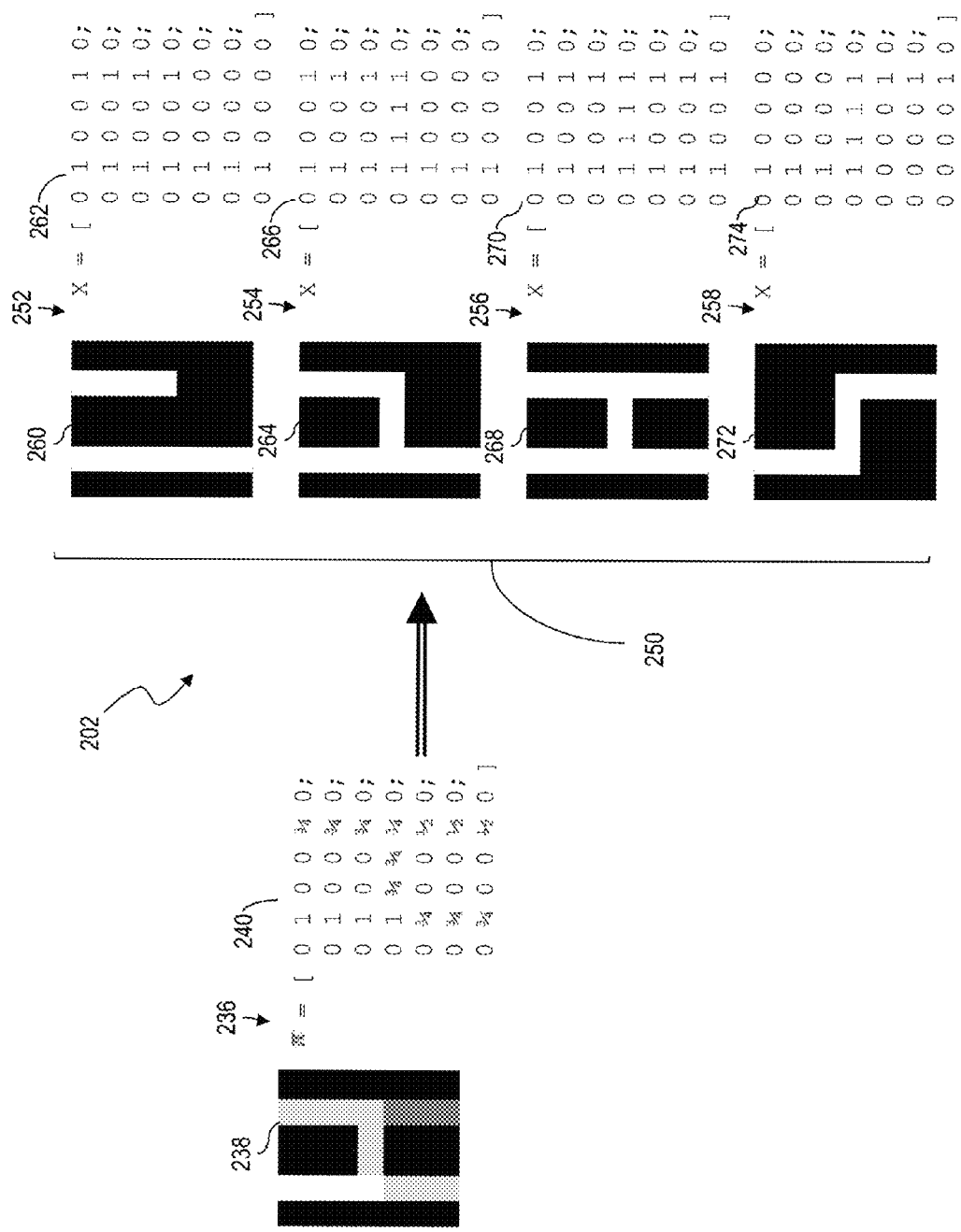
FIG. 5 is a schematic diagram illustrating a candidate layout reconstruction process that can be employed by a layout generation method according to embodiments of the invention disclosed herein.

FIG. 5 illustrates an example of a reconstruction method 202 of a second colorspace, probabilistic candidate 236 into multiple first colorspace candidates 250, here four candidates 252, 254, 256, 258. In the example, probabilistic candidate layout π can be sampled from the generative model and can be subjected to a repair procedure to produce or obtain or yield layouts or patterns 252, 254, 256, 258. For example, probabilistic candidate layout 238 can be a grayscale image and can yield binarized layouts 252, 254, 256, 258 represented as images 260, 264, 268, 272 in a two bit colorspace, though the images represent respective arrays of values 262, 266, 270, 274, here arrays X(m,n), where m=7, n=7, and each pixel can have a color value B=0 or 1. Since the pixels are "turned on" based on probability from probabilistic candidate layout 238, we can calculate error, such as design rule violation $\overrightarrow{\varepsilon^{DRC}}$ and LithoDiff function. A layout X from group of layouts 260, 264, 268, 272 can be selected using error, such as by selecting a layout that minimizes a cost function $\overrightarrow{\varepsilon^{DRC}}(X) - \text{LithoDiff}(X)$. For the example shown, probabilistic candidate layout 238 yields four binarized candidates 260, 264, 268, 272, each of which are design rule clean, so we have $\overrightarrow{\varepsilon^{DRC}}(X)=0$ for all of them. However, if LithoDiff is a number of edges in a binarized candidate, we have LithoDiff($X_{220}$)=4, LithoDiff($X_{224}$)=7, LithoDiff($X_{228}$)=8, LithoDiff($X_{232}$)=6. Therefore, the solution of the optimization problem for the example probabilistic layout 238 is binarized candidate layout 268, since it has the fewest design rule violations and at the same time the greatest lithographical difficulty.

Returning to FIG. 3, resulting candidates surviving or resulting from applying the repair procedure (block 160) can be ranked according to hot spot content (block 170), such as based on lithographic difficulty (block 172) and/or application of rules (block 174), including, but not limited to, ORC and DRC. Surviving/Resulting candidates can then be stored (block 180) and/or fed into training portion 102. As noted above, retraining may not occur frequently depending on computational load and available processing power. For example, retraining typically may be appropriate when a new technology node is employed or an inflection point occurs, such as a new photolithographic technique allowing construction of devices at a smaller scale, though other nodes or inflections may also suggest retraining.

By employing embodiments of the invention disclosed herein, layouts and/or patterns and/or clips that would typically be eliminated from consideration by current techniques, but that can still be manufactured with a satisfactory likelihood of success, can be retained. With appropriate selection of evaluation criteria, a library of such layouts/patterns/clips can be built in anticipation of a new technology node, and/or devices using current technology can be enhanced.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A semiconductor device design layout generation computer program product stored on non-transitory computer readable storage media in the form of computer executable code including instructions that when executed by a computing device cause the computing device to perform a method comprising:
applying a generative model to generate a plurality of candidate layout images based on at least a feature library including features extracted from known layouts, the features being represented by respective feature images in a first colorspace and the plurality of candidate layout images being in a second colorspace, each candidate layout image including at least one respective probabilistic layout image in the second colorspace;
ranking the plurality of candidate layout images based on a first difference value representing a degree of difference between each candidate layout image and the feature images in the feature library;

removing any candidate layout image having a first difference value below a predefined minimum first difference threshold to form a culled group of candidate layout images;

performing a repair procedure on the culled group to produce a plurality of compliant candidate layout images in the first colorspace; and ranking the plurality of compliant candidate layout images based at least in part on a respective second difference value representing a degree of difference between each compliant candidate layout image and the feature images of the feature library.

2. The computer program product of claim 1, wherein the applying a generative model to generate a plurality of candidate layout images in the second colorspace includes, for each candidate layout image:

sampling from the feature library to obtain a plurality of initial layouts in the first colorspace;

determining a respective probability of success of each initial layout; and combining the selected layout images to form a candidate layout image including a probabilistic layout image in the second colorspace, the second colorspace having at least one channel in which each pixel includes a respective channel value that represents a combined probability of success of pixels from the selected layout images.

3. The computer program product of claim 1, wherein the first difference value is a mathematical distance and the ranking of the plurality of candidate layout images includes determining a respective mathematical distance value for each candidate layout image using $L_2$ norm comparison.

4. The computer program product of claim 3, wherein the mathematical distance includes at least one of a Euclidean distance, a Hamming distance, a Mahalanobis distance, and a Manhattan distance.

5. The computer program product of claim 1, wherein the performing of the repair procedure on the culled group includes thresholding a respective channel value of each pixel using a predefined threshold channel value so that each pixel having a channel value above the threshold channel value is converted to a first color value of the first colorspace, and each pixel having a channel value below the threshold channel value is converted to a second color value of the first colorspace.

6. The computer program product of claim 1, wherein the applying of the generative model includes generating the candidate layout images using at least one probability density function of the generative model to obtain the candidate layout images in the second colorspace, and the second colorspace includes at least one channel in which each pixel has a value representing a probability of the respective pixel.

7. The computer program product of claim 6, wherein the performing of the repair procedure on the culled group includes reconstructing from each candidate layout image at least one downconverted candidate image in the first colorspace.

8. The computer program product of claim 7, wherein the performing of the repair procedure further includes determining a normalized design rule error $\overrightarrow{\epsilon^{DRC}}$ of each layout $\pi$ of the plurality of candidate layouts based at least in part on the relationship:

$$\overrightarrow{\epsilon^{DRC}} = \begin{bmatrix} \epsilon_1^{DRC}(\pi) \\ \vdots \\ \epsilon_n^{DRC}(\pi) \end{bmatrix} \text{ for } 0 \le \pi(i, j) \le 1, i \in [1, A], j \in [1, B]$$

where n is a number of rules applied to a current layout, A and B are length and width of the layout.

9. The computer program product of claim 8, wherein the performing of the repair procedure further includes minimizing the normalized error based at least in part on the relationship:

$$\min \overrightarrow{\epsilon^{DRC}}(\pi) - \text{LithoDiff}(\pi),$$

where LithoDiff is a measure of a respective photolithographic difficulty associated with each pattern m.

10. A method of semiconductor device design layout generation performed by a computing device responsive to execution by the computing device of instructions stored on a non-transitory computer readable storage device in communication with the computing device, the method comprising:

applying, with the computing device, a generative model to generate a plurality of candidate layouts based on at least a feature library of features extracted from known layouts and represented in a first colorspace, each candidate layout including a probabilistic layout image in a second colorspace having at least one channel in which each pixel includes a respective channel value that represents a combined probability of success of corresponding pixels from the sample images;

ranking, with the computing device, the plurality of candidate layout images based on a first difference value representing a degree of difference between each candidate layout image and the features in the feature library;

removing, with the computing device, any candidate layout image having a first difference value below a predefined minimum first difference value to form a culled group of candidate layout images; and performing, with the computing device, a repair procedure on the culled group to produce a plurality of compliant candidate layout images in the first colorspace, including thresholding the respective channel value of each pixel of each image of the culled group using a predefined threshold channel value representative of a desired minimum probability of success, thereby converting each pixel having a channel value above the threshold channel value to a first color value of the first colorspace and converting each pixel having a channel value below the threshold channel value to a second color value of the first colorspace.

11. The method of claim 10, wherein the ranking of the plurality of candidate layout images includes applying design rules checking (DRC) to each candidate layout image to obtain respective locations of any hotspots in the candidate layout image and ranking any hotspots by difficulty of fabrication.

12. The method of claim 10, wherein the building a feature library includes extracting features from a plurality of geometrical primitives.

13. The method of claim 10, wherein the building of the feature library includes extracting features from a plurality of known problematic design shapes.

14. A method of semiconductor layout generation performed by a computing device responsive to execution by the computing device of instructions stored on a non-transitory computer readable storage device in communication with the computing device, the method comprising:

training, with the computing device, a generative model using a feature library including training data based on known layouts, wherein the generative model is based at least in part on a probability density function (PDF) that is a function $p(X;\theta)$ of input layout data X that includes a set $X_i, \ldots, X_N \in \mathbb{R}^d$ and model parameters $\theta$ based at least in part on a likelihood L of data X;

generating, with the computing device, a plurality of candidate layouts using the generative model and the feature library by sampling from the generative model;

selecting, with the computing device, candidate layouts having an associated probability above a predefined minimum probability threshold to obtain a sample layout group; and performing, with the computing device, a repair procedure on the sample layout group to obtain at least one clean candidate layout.

15. The method of claim 14, wherein the features in the feature library include at least one of geometrical primitives, raster, and diffraction orders.

16. The method of claim 14, wherein a Gaussian mixture model (GMM) is applied and the PDF includes the relationship:

$$p(X;\theta) = \Sigma_{k=1}^{K} \alpha_k g(X;\mu_k,\sigma_k) \qquad (1),$$

linearly combining a plurality K of Gaussian PDFs including the relationship $$g(X;\mu_k,\sigma_k) = \frac{1}{(\sqrt{2\pi}\,\sigma_k)^d} e^{-\frac{1}{2}\left(\frac{\|x-\mu_k\|}{\sigma_k}\right)^2}, \qquad (2)$$

in which $\alpha_k$ is a coefficient that describes the relative contribution of each Gaussian PDF and $\mu_k$ and $\sigma_k$ are the mean and standard deviation of each Gaussian PDF, and the model parameters $\theta$ can be defined at least in part by the relationship $$\theta = [\theta_k]_{k=\overline{1,K}} = [(\alpha_k,\mu_k,\sigma_k)]_{k=\overline{1,K}} \qquad (3).$$

17. The method of claim 16, wherein during the training of the generative model, parameters $\theta$ are determined by maximizing a likelihood L of data X based at least in part on the relationship:

$$L(\theta) = L([(\alpha_k,\mu_k,\sigma_k)]_{k=\overline{1,K}}) = \Pi_{i=1}^{N}\Sigma_{k=1}^{K}\alpha_k g(X_i;\mu_k,\sigma_k) \qquad (4)$$

such that $$\theta^* = [(\alpha_k^*,\mu_k^*,\sigma_k^*)]_{k=\overline{1,K}} = \arg\max_{\alpha_k,\mu_k,\sigma_k} L([(\alpha_k,\mu_k,\sigma_k)]_{k=\overline{1,K}}) \qquad (5).$$

18. The method of claim 14, wherein the performing of the repair procedure includes ranking the candidate layouts of the sample layout group based on a degree of difference between each layout of the sample layout group and the training data.

19. The method of claim 18, wherein the degree of difference between each layout of the sample layout group and the training data is based at least in part on using a normalized design rule error $\overrightarrow{\epsilon^{DRC}}$ of each sampled layout $\pi$ of the plurality of candidate layouts based at least in part on the relationship:

$$\overrightarrow{\epsilon^{DRC}} = \begin{bmatrix} \epsilon_1^{DRC}(\pi) \\ \vdots \\ \epsilon_n^{DRC}(\pi) \end{bmatrix} \text{ for } 0 \leq \pi(i,j) \leq 1,\, i \in [1,A],\, j \in [1,B]$$

where n is a number of rules applied to a current layout, and minimizing the normalized design rule error based at least in part on the relationship:

$$\min \overrightarrow{\epsilon^{DRC}}(\pi) - \text{LithoDiff}(\pi),$$

where LithoDiff is a measure of a respective photolithographic difficulty associated with each pattern $\pi$.

* * * * *